United States Patent
Kim et al.

(10) Patent No.: US 11,631,871 B2
(45) Date of Patent: Apr. 18, 2023

(54) STARTUP CONTROL METHOD AND CONTROL SYSTEM FOR FUEL CELL

(71) Applicants: Hyundai Motor Company, Seoul (KR); Kia Motors Corporation, Seoul (KR)

(72) Inventors: Mi Sun Kim, Gyeonggi-do (KR); Dae Jong Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 308 days.

(21) Appl. No.: 16/049,009

(22) Filed: Jul. 30, 2018

(65) Prior Publication Data

US 2019/0288307 A1    Sep. 19, 2019

(30) Foreign Application Priority Data

Mar. 14, 2018  (KR) ........................ 10-2018-0029637

(51) Int. Cl.
| | | |
|---|---|---|
| *H01M 8/04302* | (2016.01) | |
| *H01M 8/04537* | (2016.01) | |
| *H01M 8/0432* | (2016.01) | |
| *H01M 8/04225* | (2016.01) | |
| *H02J 7/00* | (2006.01) | |
| *H01M 8/04089* | (2016.01) | |
| *H01M 8/04746* | (2016.01) | |
| *H01M 10/42* | (2006.01) | |

(Continued)

(52) U.S. Cl.
CPC ......... *H01M 8/04225* (2016.02); *B60L 58/31* (2019.02); *F04B 49/20* (2013.01); *F04B 49/22* (2013.01); *H01M 8/04089* (2013.01); *H01M 8/04761* (2013.01); *H01M 10/425* (2013.01); *H01M 10/44* (2013.01); *H01M 16/006* (2013.01); *H02J 7/0068* (2013.01); *F04B 35/04* (2013.01); *H01M 2010/4271* (2013.01)

(58) Field of Classification Search
None
See application file for complete search history.

(56) References Cited

U.S. PATENT DOCUMENTS 8,835,065 B2    9/2014  Burch et al.
9,496,572 B2    11/2016 Mp et al.
(Continued)

FOREIGN PATENT DOCUMENTS

JP    H08078030 A    3/1996
KR    20150026265 A   3/2015
(Continued)

OTHER PUBLICATIONS

Office Action dated Dec. 20, 2022 in corresponding Korean Patent Application No. 10-2018-0029637.

*Primary Examiner* — Cynthia H Kelly
*Assistant Examiner* — Julian Anthony
(74) *Attorney, Agent, or Firm* — Fox Rothschild LLP

(57) ABSTRACT

A startup control method for a fuel cell is provided. The method includes calculating available power of a high-voltage battery when a startup of the fuel cell is requested. An air compressor is then driven based on a calculated magnitude of the available power of the high-voltage battery and a low-voltage battery is charged with the power of the high-voltage battery after the driving of the air compressor is completed.

9 Claims, 4 Drawing Sheets

(51) Int. Cl.
*H01M 16/00* (2006.01)
*F04B 49/20* (2006.01)
*F04B 49/22* (2006.01)
*H01M 10/44* (2006.01)
*B60L 58/31* (2019.01)
*F04B 35/04* (2006.01)

(56) References Cited

U.S. PATENT DOCUMENTS

| | | | |
|---|---|---|---|
| 2006/0216555 A1* | 9/2006 | Shige | H01M 8/0494 |
| | | | 429/429 |
| 2011/0143241 A1* | 6/2011 | Tighe | H01M 8/04746 |
| | | | 429/428 |
| 2011/0213516 A1* | 9/2011 | Choi | H01M 8/04776 |
| | | | 701/22 |
| 2012/0200257 A1* | 8/2012 | Schwarz | H01M 10/42 |
| | | | 320/109 |
| 2012/0328968 A1* | 12/2012 | Honda | H01M 8/04761 |
| | | | 429/446 |
| 2014/0342258 A1* | 11/2014 | Burch | H01M 8/04626 |
| | | | 429/429 |
| 2015/0283915 A1* | 10/2015 | Kim | H01M 10/625 |
| | | | 320/104 |
| 2016/0133965 A1 | 5/2016 | Imanishi et al. | |
| 2016/0181636 A1 | 6/2016 | Alp et al. | |
| 2018/0354388 A1* | 12/2018 | Kim | H01M 8/04559 |

FOREIGN PATENT DOCUMENTS

| | | |
|---|---|---|
| KR | 10-2015-0043613 A | 4/2015 |
| KR | 10-2017-0096409 A | 8/2017 |
| KR | 20170122366 A | 11/2017 |

\* cited by examiner

STARTUP CONTROL METHOD AND CONTROL SYSTEM FOR FUEL CELL

CROSS REFERENCE TO RELATED APPLICATION

The present application claims priority to Korean Patent Application No. 10-2018-0029637, filed on Mar. 14, 2018, the entire contents of which is incorporated herein for all purposes by this reference.

BACKGROUND

1. Technical Field

The present disclosure relates to a startup control method and control system for a fuel cell, and more particularly, to a startup control method and control system for a fuel cell that adjust a rotation speed of an air compressor and an opening degree of an air pressure control valve based on available power of a high-voltage battery.

2. Description of the Related Art

A fuel cell is a type of generator that converts chemical energy into electrical energy by an electrochemical reaction in a fuel cell stack without converting the chemical energy of fuel into heat by combustion, and may be used to supply electric power to small electric/electronic products, in particular, portable apparatuses as well as to supply electric power for industries, electric power for a home, and electric power for driving a vehicle. In a fuel cell, hydrogen and oxygen react with each other to produce electric energy. The generated electric energy may drive a motor in a fuel cell vehicle to be used as a power source for the vehicle or may be used for a power generation function which provides electric energy to a home, an office, a factory or the like through an external power supply network.

Generally, when a startup request is generated while the startup of the fuel cell is in an off state, a startup sequence operates a low-voltage converter immediately after a high-voltage battery and a high-voltage converter are boosted to charge a low-voltage battery. However, the low-voltage converter charging the low-voltage battery uses maximum power under conditions where a state of charge of the low-voltage battery is insufficient or a load of electric parts connected to the low-voltage battery is large.

However, when the charging power of the low-voltage battery is large and the available power the high-voltage battery is low, the fuel cell may fail to startup due to insufficient power available to drive an air compressor which requires a largest amount of power among components driven at the time of the startup of the fuel cell.

Accordingly, when the available power of the high-voltage battery is less than the sum of the charging power of the low-voltage battery and the driving power of the air compressor at the time of the startup of the fuel cell, a control for changing a startup control sequence of driving the air compressor and then charging the low-voltage battery is developed. However, when the driving power of the air compressor based on a fixed target rotation speed is greater than the available power of the high-voltage battery even when the control method is adopted, the fuel cell may fail to startup and the low-voltage battery may be discharged due to the delay of the operation of the low-voltage converter.

The matters described as the related art have been provided merely for assisting in the understanding for the background of the present disclosure and should not be considered as corresponding to the related art known to those skilled in the art.

SUMMARY

An object of the present disclosure is to provide a startup control method for a fuel cell capable of minimizing a startup failure of the fuel cell by variably adjusting a rotation speed of an air compressor based on available power of a high-voltage battery and compensating for air supply shortage by changing an opening degree of an air pressure control valve.

According to an exemplary embodiment of the present disclosure, a startup control method for a fuel cell may include: calculating available power of a high-voltage battery when a startup of the fuel cell is requested; adjusting driving of an air compressor based on the calculated magnitude of the available power of the high-voltage battery; and charging a low-voltage battery with the power of the high-voltage battery after the driving control of the air compressor is completed.

The startup control method may further include: comparing the calculated available power of the high-voltage battery with driving power required for the driving of the air compressor at a predetermined fixed target rotation speed, wherein in response to determining that the available power of the high-voltage battery is less than the driving power of the air compressor, a target rotation speed may vary to adjust the driving of the air compressor. In response to determining that the available power of the high-voltage battery is equal to or greater than the driving power of the air compressor, the air compressor may be operated to the predetermined fixed target rotation speed.

In the calculating of the available power of the high-voltage battery, the available power of the high-voltage battery may be calculated based on a temperature and a state of charge (SOC) of the high-voltage battery at the time of the startup request of the fuel cell. In addition, the air compressor may be driven at a target rotation speed varying in response to an increasing rate of the rotation speed of the air compressor, and the increasing rate of the rotation speed of the air compressor may be determined based on the calculated magnitude of the available power of the high-voltage battery.

The increasing rate of the rotation speed of the air compressor may be determined to be increased as the magnitude of the available power of the high voltage battery is increased. The driving of the air compressor may further include determining an opening degree of a pressure control valve formed in an air discharge line of the fuel cell in response to the determined increasing rate of the rotation speed of the air compressor and adjusting the pressure control valve based on the determined opening degree. The opening degree of the pressure control valve may be determined to be reduced as the increasing rate of the rotation speed of the air compressor is increased. In the charging of the low-voltage battery, a low-voltage converter disposed between the high-voltage battery and the low-voltage battery may be operated to charge the low-voltage battery.

According to an exemplary embodiment of the present disclosure, a startup control system for a fuel cell may include: a fuel cell; an air compressor configured to supply air to the fuel cell; a low-voltage battery configured to supply power to electric parts; a high-voltage battery configured to supply stored power to the air compressor or the low-voltage battery; and a controller configured to calculate available power of the high-voltage battery when the startup of the fuel cell is requested, drive the air compressor based on the calculated magnitude of the available power of the high-voltage battery, and charge the low-voltage battery using the power of the high-voltage battery after the driving control of the air compressor is completed.

The controller may be configured to drive the air compressor at a target rotation speed varying in response to an increasing rate of the rotation speed of the air compressor, and the increasing rate of the rotation speed of the air compressor may be determined based on the calculated magnitude of the available power of the high-voltage battery. The startup control system may further include: a pressure control valve disposed on an air discharge line of the fuel cell, wherein the controller may be configured to determine an opening degree of a pressure control valve formed on an air discharge line of the fuel cell in response to the determined increasing rate of the rotation speed of the air compressor and adjust the pressure control valve based on the determined opening degree. The startup control system may further include: a low-voltage converter disposed between the high-voltage battery and the low-voltage battery, wherein the controller may be configured to operate the low-voltage converter to charge the low-voltage battery with the power of the high-voltage battery.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Figure 1:
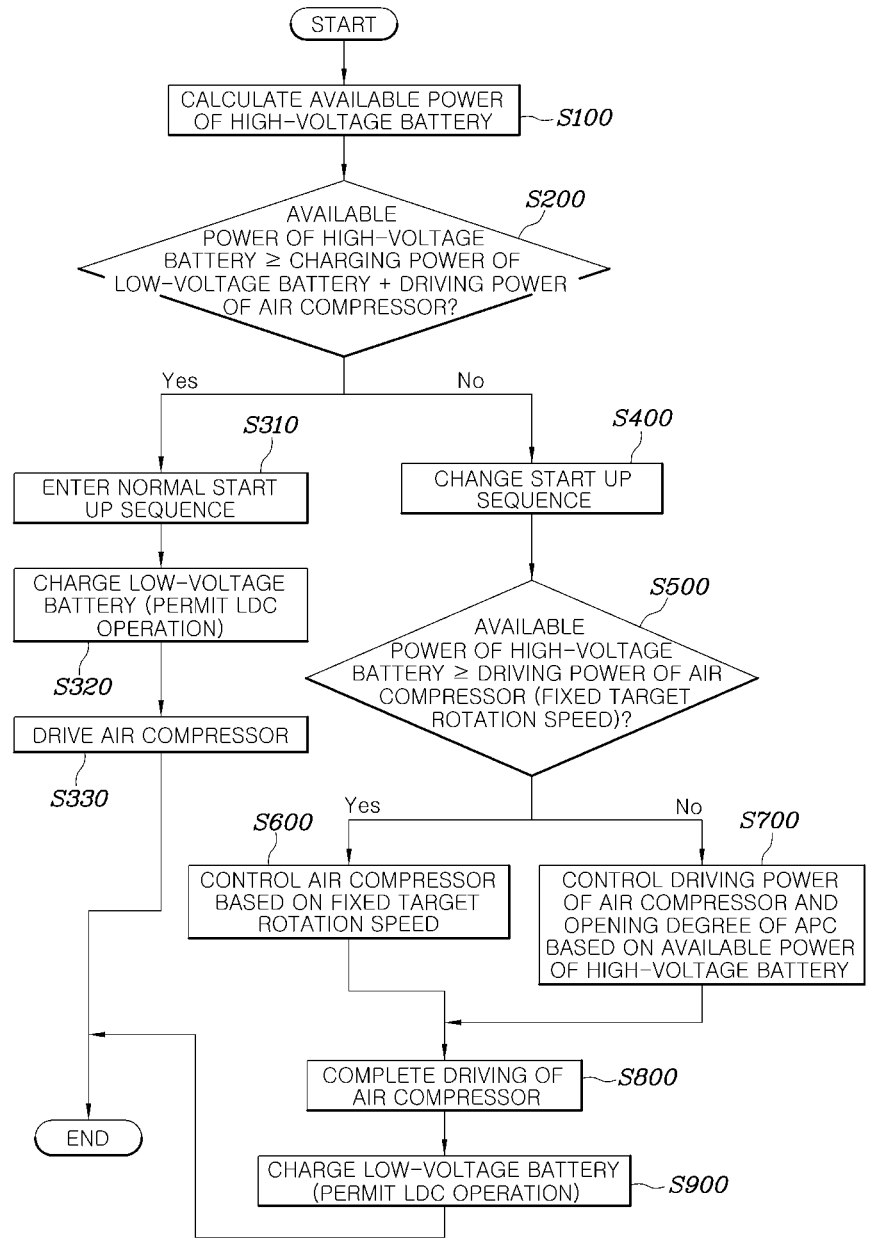
FIG. 1 is a flow chart of a startup control method of a fuel cell according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specifically structural and functional descriptions in exemplary embodiment of the present disclosure disclosed in the present specification or the present application are illustrated to describe exemplary embodiments of the present disclosure and therefore, the exemplary embodiments of the present disclosure may be practiced in various forms and are not to be construed as being limited to the exemplary embodiment of the present disclosure disclosed in the present specification or the present application.

Since exemplary embodiments of the present disclosure may be various modified and may have several forms, specific exemplary embodiments will be shown in the accompanying drawings and will be described in detail in the present specification or disclosure. However, it is to be understood that the present disclosure is not limited to the specific exemplary embodiments, but includes all modifications, equivalents, and substitutions included in the spirit and the scope of the present disclosure.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present disclosure.

It is to be understood that when one component is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" and the like, should be similarly interpreted.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, exemplary embodiments of the present disclosure will be described in detail with reference to the accompanying drawings. Like reference numerals proposed in each drawing denote like components.

FIG. 1 is a flow chart of a startup control method of a fuel cell according to an exemplary embodiment of the present disclosure. The method described herein below may be executed by a controller having a processor and a memory. Referring to FIG. 1, a startup control method for a fuel cell according to an exemplary embodiment of the present disclosure may include: calculating available power of a high-voltage battery when a startup of the fuel cell is requested (S100); driving of an air compressor based on the calculated magnitude of the available power of the high-voltage battery (S600 and S700); and charging a low-voltage battery with the power of the high-voltage battery after driving of the air compressor is completed (S900).

When the available power of the high-voltage battery is sufficient, a normal startup sequence is entered (S310) to first charge the low-voltage battery (S320), and the air compressor may be driven (S330) to complete the startup of the fuel cell. Alternatively, the air compressor may be driven simultaneously with the charging of the low-voltage battery. However, since the startup control method of the fuel cell according to the exemplary embodiment of the present disclosure cannot perform the normal startup control due to the problem in that the available power of the high-voltage battery is insufficient, and the air compressor may first be driven and the low-voltage battery for the startup of the fuel cell may be charged after the driving control of the air compressor is completed. Accordingly, there is an effect of minimizing a situation in which the startup of the fuel cell does not fail even when the available power of the high-voltage battery is insufficient and the normal startup control of the fuel cell is impossible.

The startup request of the fuel cell may be a request of a user to turn on the fuel cell system in a start off state. In other words, the startup request may be a request for power generation of the fuel cell. In particular, in a fuel cell vehicle, the startup request may be a turn-on request for a startup of a vehicle by a driver. Alternatively, the startup request may be a request of a controller to resume the power generation of the fuel cell in an FC Stop mode state which is the state in which only the power generation of the fuel cell is turned off in the turn-on state of the startup of the vehicle.

In the calculating of the available power of the high-voltage battery (S100), it may be possible to calculate the power capable of being discharged from the present high-voltage battery. Specifically, the available power of the high-voltage battery is affected by a temperature and a state of charge (SOC). Even when they have the same state of charge, the available power at a low temperature is remarkably reduced. Accordingly, the available power of the high-voltage battery may be calculated based on the temperature and the state of charge (SOC) of the high-voltage battery at the time of the startup request of the fuel cell. Specifically, the magnitude of the available power varying in response to the temperature and the state of charge may be stored in a map in advance, and the magnitude of the available power depending on the temperature and the state of charge may be calculated.

First, after the calculating of the available power of the high-voltage battery (S100), the available power of the high-voltage battery may be compared with the sum of the charging power of the low-voltage battery and the driving power of the air compressor (S200). When the available power of the high-voltage battery is equal to or greater than the sum of the charging power of the low-voltage battery and the driving power of the air compressor, the normal startup sequence may be executed (S310). The startup may be completed by the sequence of first charging the low-voltage battery (S320) and then driving the air compressor (S330).

However, the startup control method of the fuel cell according to the exemplary embodiment of the present disclosure assumes that the startup sequence is changed (S400) when the available power of the high-voltage battery is less than the sum of the charging power of the low-voltage battery and the driving power of the air compressor. Specifically, the control may be performed by the sequence of first driving the air compressor (S600, S700) and charging the startup low-voltage battery of the fuel cell after the driving control of the air compressor is completed (S900).

Prior to driving the air compressor (S600, S700), the startup control method may further include comparing the calculated available power of the high-voltage battery with the driving power required for the driving of the air compressor at the predetermined fixed target rotation speed (S500). When the available power of the high-voltage battery is less than the driving power required when the air compressor is driven at the predetermined fixed target rotation speed, the target rotation speed may vary to adjust the driving of the air compressor.

In general, when the fuel cell starts-up, the air compressor may be driven and operated at the predetermined fixed target rotation speed (S600). However, when the available power of the high-voltage battery is less than the driving power required when the air compressor is driven at the predetermined fixed target rotation speed, the target rotation speed for operating the air compressor varies to reduce the driving power of the air compressor (S700).

In response to determining that the available power of the high-voltage battery is equal to or greater than the driving power of the air compressor, the air compressor may be operated at the predetermined fixed target rotation speed. The predetermined fixed target rotation speed may be set to be a rotation speed at which sufficient air may be supplied to the fuel cell to generate power in the fuel cell within the time when the startup time is delayed and thus the low-voltage battery is not discharged. Accordingly, even when the available power of the high-voltage battery is less than the driving power required when the air compressor is driven at the predetermined fixed target rotation speed, the startup of the fuel cell may normally be completed without failing to startup the fuel cell.

Figure 3:
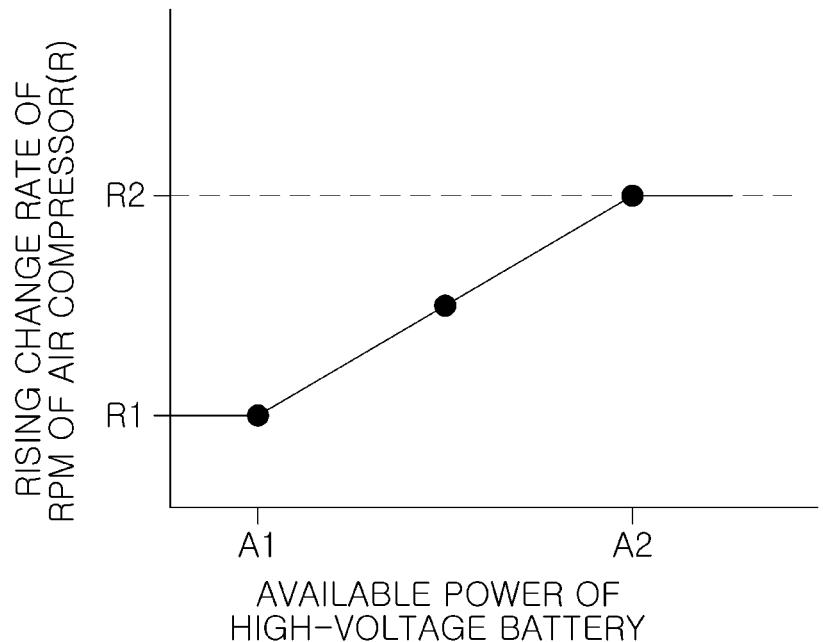
FIG. 3 is a graph showing a relationship between available power of the high-voltage battery and an increasing rate of a rotation speed of an air compressor an exemplary embodiment of the present disclosure.

FIG. 3 is a graph showing a relationship between available power of the high-voltage battery of the present disclosure and an increasing rate of a rotation speed of an air compressor. Referring to FIG. 3, in the driving of the air compressor (S700), the air compressor may be driven at the target rotation speed varying in response to the increasing rate of the rotation speed of the air compressor, and the increasing rate of the rotation speed of the air compressor may be determined based on the calculated magnitude of the available power of the high-voltage battery.

The increasing rate of the rotation speed of the air compressor may be determined to be increased as the magnitude of the available power of the high-voltage battery is increased. Specifically, as shown in FIG. 3, the increasing rate of the rotation speed of the air compressor may be determined to have a direct proportional relationship in which the increasing rate of the rotation speed of the air compressor is increased as the magnitude of the available power of the high-voltage battery is increased in a section where the available power of the high-voltage battery is between A1 and A2.

When the available power of the high-voltage battery is A2 or greater, the increasing rate of the rotation speed of the air compressor may be determined as R2, and when the available power of the high-voltage battery is equal to or less than A1, the increasing rate of the rotation speed of the air compressor may be determined as R1. Accordingly, it may be possible to minimize the possibility that the fuel cell cannot startup by optimizing the power consumption of the air compressor by varying the increasing rate of the rotation speed of the air compressor based on the available power of the high-voltage battery.

Figure 4:
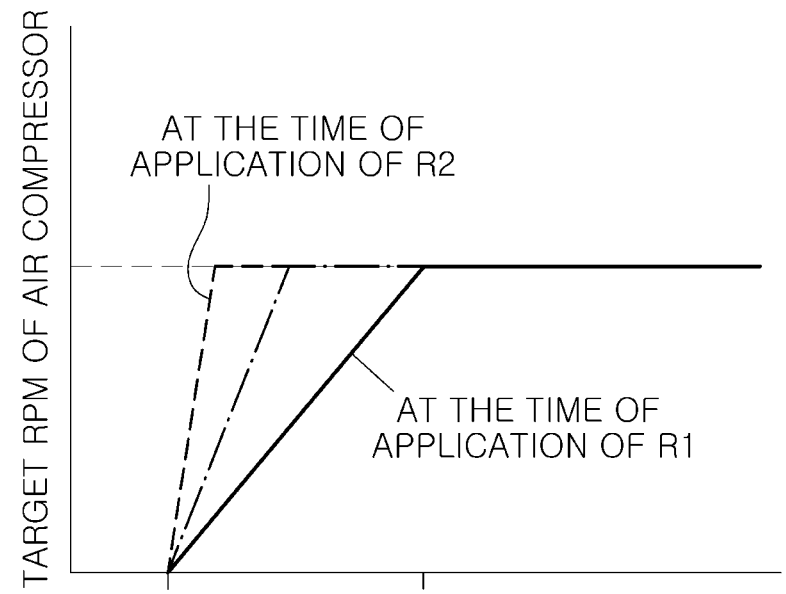
FIG. 4 is a graph showing a target rotation speed of the air compressor according to an exemplary embodiment of the present disclosure over time.

FIG. 4 is a graph showing a target rotation speed of the air compressor according to the present disclosure over time. Referring to FIG. 4, in the driving of the air compressor (S700), the air compressor may be driven at the target rotation speed varying in response to the increasing rate of the rotation speed of the air compressor.

The target rotation speed of the air compressor varying in response to the increasing rate of the rotation speed of the air compressor may be as shown in FIG. 3. The air compressor may be operated to follow the target rotation speed, but the target rotation speed of the air compressor may vary in response to the increasing rate of the rotation speed of the air compressor to be increased to a predetermined final target rotation speed.

When the target rotation speed of the air compressor is converged to the predetermined final target rotation speed, the target rotation speed of the air compressor may be adjusted to the fixed final target rotation speed. Specifically, when the available power of the high-voltage battery is less than or equal to A1 and the increasing rate of the rotation speed of the air compressor is determined as R1, the target rotation speed of the air compressor may be increased with a relatively small gradient (e.g., the target rotation speed may be gradually increased). When the available power of the high-voltage battery is greater than or equal to A2 and the increasing rate of the rotation speed of the air compressor is determined as R2, the target rotation speed of the air compressor may be increased with a relatively large gradient (e.g., the target rotation speed may be rapidly increased).

Figure 5:
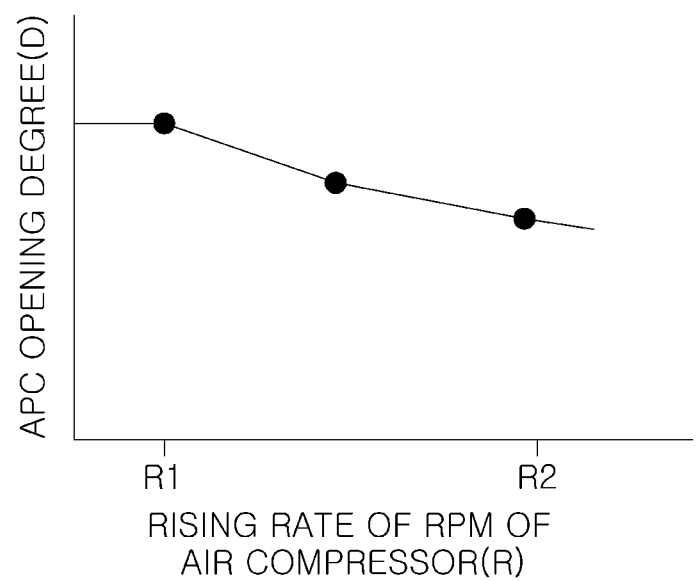
FIG. 5 is a diagram showing the relationship between the increasing rate of the rotation speed of the air compressor and an opening degree of the air pressure control valve an exemplary embodiment of the present disclosure.

FIG. 5 is a diagram showing the relationship between the increasing rate of the rotation speed of the air compressor of the present disclosure and an opening degree of the air pressure control valve. Referring to FIG. 5, the driving of the air compressor (S700) may further include determining the opening degree of the pressure control valve formed in an air discharge line of the fuel cell in response to the determined increasing rate of the rotation speed of the air compressor and adjusting the pressure control valve based on the determined opening degree.

The opening degree of the pressure control valve may be determined to be reduced as the increasing rate of the rotation speed of the air compressor is increased. Since the flow rate of the air supplied to the fuel cell by the air compressor may be reduced as the target rotation speed of the air compressor varies, the opening degree of the pressure control valve formed in the air discharge line of the fuel cell may be adjusted to ensure the sufficient air flow rate.

As shown in FIG. 5, the opening degree of the pressure control valve may be reduced as the increasing rate of the rotation speed of the air compressor is increased. The opening degree of the pressure control valve may be inversely proportional to the increasing rate of the rotational speed of the air compressor in a section in which the increasing rate of the rotation speed of the air compressor is between R1 and R2.

In addition, when the available power of the high-voltage battery is less than or equal to A1 and the increasing rate of the rotation speed of the air compressor is determined as R1, the opening degree of the pressure control valve may be determined as D2, and when the available power of the high-voltage battery is determined to be equal to or greater than A2 or greater and the increasing rate of the rotation speed of the air compressor is determined as R2, the opening of the pressure control valve may be determined as D1. Accordingly, the reduction of the air flow rate supplied to the fuel cell according to the variation of the rotation speed of the air compressor may be compensated by varying the opening degree of the pressure control valve. Therefore, it may be possible to prevent the low-voltage battery from being discharged through the operation delay of the minimum low-voltage converter by preventing the startup time of the fuel cell from increasing. In addition, the fuel cell may startup without degrading the performance of the fuel cell and electric parts even in the situation where the startup is impossible.

In the charging of the low-voltage battery (S900), after the driving control of the air compressor is completed, the low-voltage battery may be charged using the power of the high-voltage battery. A low-voltage converter (LDC) disposed between the high-voltage battery and the low-voltage battery may be operated to charge the low-voltage battery.

The driving control of the air compressor may be determined to be completed when the rotation speed of the air compressor reaches the predetermined final target rotation speed. Alternatively, the driving control of the air compressor may be determined to be completed when the air supply flow rate supplied to the fuel cell becomes equal to or greater than a predetermined reference value. In another exemplary embodiment, the power generation may be started in the fuel cell as the air compressor supplies air to the fuel cell. Therefore, the driving control of the air compressor may be determined to be completed when the power output from the fuel cell is generated or becomes equal to or greater than the predetermined power value.

After the driving control of the air compressor is completed, the operation of the low-voltage converter disposed between the high-voltage battery and the low-voltage battery is permitted, such that it is possible to operate the low-voltage battery to be charged using the power of the high-voltage battery (S900). When the power output from the fuel cell is generated, the low-voltage battery may be charged using the output power of the fuel cell.

Figure 2:
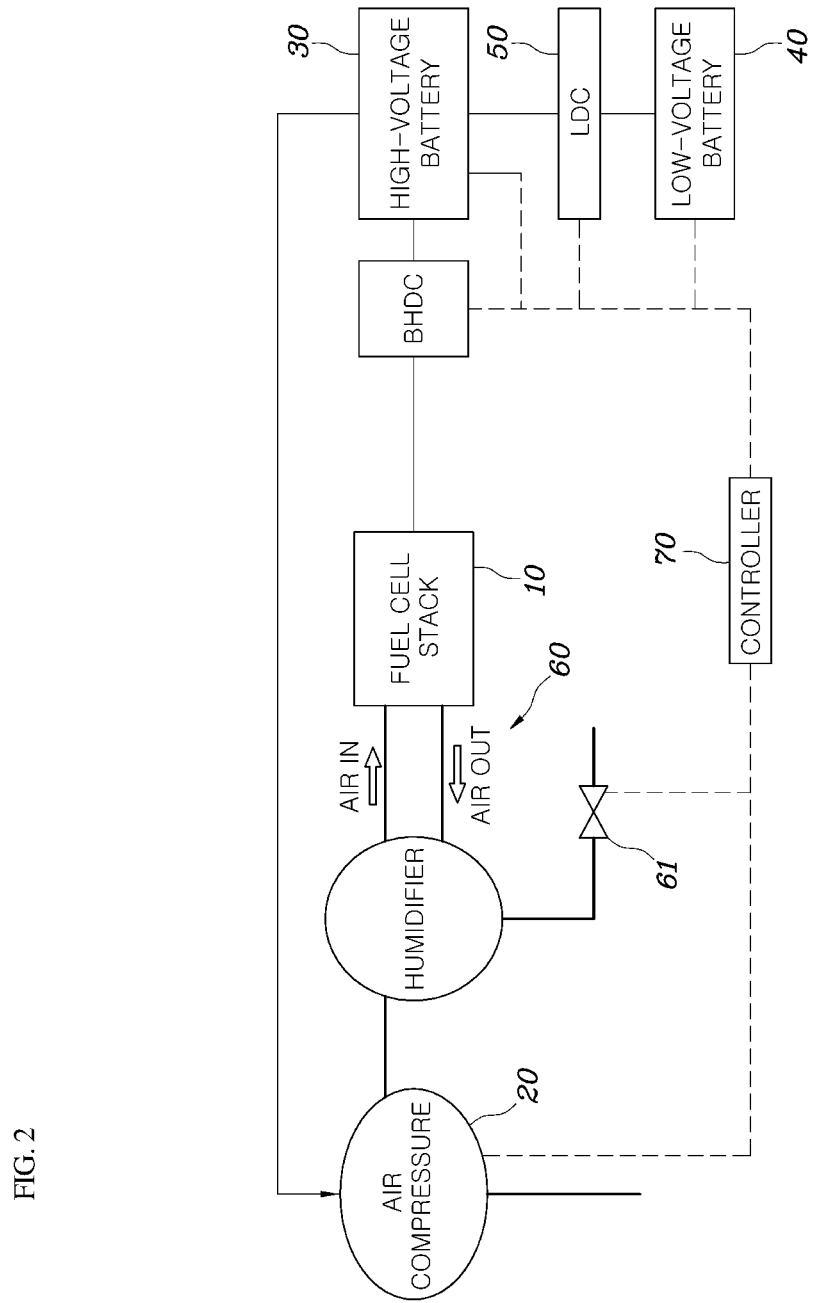
FIG. 2 is a flow chart of a startup control system of a fuel cell according to an exemplary embodiment of the present disclosure.

FIG. 2 is a configuration diagram of a startup control system of a fuel cell 10 according to an exemplary embodiment of the present disclosure. Referring to FIG. 2, the startup control system may include: a fuel cell 10; an air compressor 20 configured to supply air to the fuel cell 10; a low-voltage battery 40 configured to supply power to electric parts; a high-voltage battery 30 configured to supply stored power to the air compressor 20 or the low-voltage battery 40; and a controller 70 configured to calculate the available power of the high-voltage battery 30 when the startup of the fuel cell 10 is requested, drive the air compressor 20 based on the calculated magnitude of the available power of the high-voltage battery 30, and charge the low-voltage battery 40 using the power of the high-voltage battery 30 after the driving of the air compressor 20 is completed.

The fuel cell 10 may be configured to generate power through a chemical reaction using supplied hydrogen and oxygen. The fuel cell 10 may be connected to an inverter and a motor via a main bus terminal. The high-voltage battery 30 may be connected to the main bus terminal, and a bidirectional high-voltage direct current/direct current (DC/DC) converter (BHDC) may be disposed between the high-voltage battery 30 and the main bus terminal. The controller 70 may be configured to operate a bidirectional converter to charge the high-voltage battery 30 with the power of the fuel cell 10 or to discharge the high-voltage battery 30 and supply power to the main bus terminal.

The electric parts requiring a high-voltage such as the air compressor 20 may be connected to the high-voltage battery 30 based on a rated voltage. Alternatively, some electric parts may be connected to the low-voltage battery 40. The low-voltage battery 40 may be connected directly to the high-voltage battery 30 or may be connected to the high-voltage battery 30 via the main bus terminal. The low-voltage converter 50 (LDC) may be disposed between the low-voltage battery 40 and the high-voltage battery 30 or between the low-voltage battery 40 and the main bus terminal. The controller 70 may be configured to operate the low-voltage converter 50 to supply power to the low-voltage battery 40 to charge the low-voltage battery 40.

An air supply line configured to supply air to the stack of the fuel cells 10 and an air discharge line 60 configured to discharge air passing through the stack of the fuel cells 10 to the outside may be formed. The air supply line may be provided with the air compressor 20 for supplying air to the stack of fuel cells 10, and the air discharge line 60 may be provided with an air pressure control valve 61 (APC). The pressure control valve 61 may be configured to adjust the air pressure of the air supply line, the inside of the stack of the fuel cells 10, and the air discharge line 60 by adjusting the opening degree.

The controller 70 may be a controller included in the fuel cell system, and may be a controller which is a part of a fuel cell controller (FCU) or a controller that is separated to execute the startup of the fuel cell. The controller 70 may be configured to drive or operate the air compressor 20 at the target rotation speed varying in response to the increasing rate of the rotation speed of the air compressor 20, and the increasing rate of the rotation speed of the air compressor 20 may be determined based on the calculated magnitude of the available power of the high voltage battery 30.

The startup control system may further include a pressure control valve 61 which is formed on the air discharge line 60 of the fuel cell 10, and the controller 70 may be configured to determine the opening degree of the pressure control valve 61 formed on the air discharge line 60 of the fuel cell 10 in response to the determined increasing rate of the rotation speed of the air compressor 20, and operate the pressure control valve 61 based on the determined opening degree. The startup control system may further include the low-voltage converter 50 disposed between the high-voltage battery 30 and the low-voltage battery 40, and the controller 70 may be configured to operate the low-voltage converter 50 to charge the low-voltage battery 40 with the power of the high-voltage battery 30.

According to the startup control method for the fuel cell of the present disclosure, it may be possible to minimize the failure of the startup of the fuel cell by changing the target rotation speed of the air compressor. Further, it may be possible to ensure the air flow rate required for the startup of the fuel cell by adjusting the opening degree of the air pressure control valve to compensate for the reduction in the rotation speed of the air compressor. Further, it may be possible to prevent the low-voltage battery from being discharged by preventing the startup time of the fuel cell from being delayed.

Although the present disclosure has been shown and described with respect to specific exemplary embodiments, it will be obvious to those skilled in the art that the present disclosure may be variously modified and altered without departing from the spirit and scope of the present disclosure as defined by the following claims

What is claimed is:

1. A startup control method for a fuel cell, comprising:
   calculating, by a controller, available power of a first-voltage battery when a startup of the fuel cell is requested;
   comparing, by the controller, the calculated available power of the first-voltage battery with driving power required for driving an air compressor at a predetermined fixed target rotation speed, wherein in response to determining that the available power of the first-voltage battery is less than the driving power of the air compressor, the target rotation speed is varied to adjust the driving of the air compressor;
   driving, by the controller, the air compressor based on a calculated magnitude of the available power of the first-voltage battery and the target rotation speed varying in response to an increasing change rate of the rotation speed of the air compressor; and
   charging, by the controller, a second-voltage battery with the power of the first-voltage battery after the driving of the air compressor is completed,
   wherein the first-voltage battery has a higher voltage than the second-voltage battery, and
   wherein the driving of the air compressor further includes:
      determining, by the controller, an opening degree of a pressure control valve formed in an air discharge line of the fuel cell in response to the increasing change rate of the rotation speed of the air compressor; and
      operating, by the controller, the pressure control valve based on the determined opening degree,
      wherein the opening degree of the pressure control valve is inversely proportional to the increasing change rate of the rotation speed of the air compressor according to the available power of the first-voltage battery.

2. The startup control method of claim 1, wherein in response to determining that the available power of the first-voltage battery is equal to or greater than the driving power of the air compressor, the air compressor is operated at the predetermined fixed target rotation speed.

3. The startup control method of claim 1, wherein the available power of the first-voltage battery is calculated based on a temperature and a state of charge (SOC) of the first-voltage battery at the time of the startup request of the fuel cell.

4. The startup control method of claim 1, wherein the increasing change rate of the rotation speed of the air compressor is determined based on the calculated magnitude of the available power of the first-voltage battery.

5. The startup control method of claim 4, wherein the increasing change rate of the rotation speed of the air compressor is determined to be increased as the magnitude of the available power of the first-voltage battery is increased.

6. The startup control method of claim 1, further comprising:
operating, by a controller, a converter disposed between the first-voltage battery and the second-voltage battery to charge the second-voltage battery.

7. A startup control system for a fuel cell, comprising:
a fuel cell;
an air compressor configured to supply air to the fuel cell;
a second-voltage battery configured to supply power to electric parts;
a first-voltage battery configured to supply stored power to the air compressor or the second-voltage battery, wherein the first-voltage battery has a higher voltage than the second-voltage battery;
a pressure control valve disposed on an air discharge line of the fuel cell; and
a controller configured to:
calculate available power of the first-voltage battery when the startup of the fuel cell is requested;
compare the calculated available power of the first-voltage battery with driving power required for driving the air compressor at a predetermined fixed target rotation speed, wherein in response to determining that the available power of the first-voltage battery is less than the driving power of the air compressor, the target rotation speed is varied to adjust the driving of the air compressor;
drive the air compressor based on a calculated magnitude of the available power of the first-voltage battery and the target rotation speed varying in response to an increasing change rate of the rotation speed of the air compressor; and
charge the second-voltage battery using the power of the first-voltage battery after the driving of the air compressor is completed,
wherein the controller is configured to determine an opening degree of the pressure control valve formed on the air discharge line of the fuel cell in response to the determined increasing change rate of the rotation speed of the air compressor and operate the pressure control valve based on the determined opening degree, and
wherein the opening degree of the pressure control valve is inversely proportional to the increasing change rate of the rotation speed of the air compressor according to the available power of the first-voltage battery.

8. The startup control system of claim 7, wherein the increasing change rate of the rotation speed of the air compressor is determined based on the calculated magnitude of the available power of the first-voltage battery.

9. The startup control system of claim 7, further comprising:
a converter disposed between the first-voltage battery and the second-voltage battery, wherein the controller is configured to operate the converter to charge the second-voltage battery with the power of the first-voltage battery.

* * * * *